(12) United States Patent
Borowiak, Jr. et al.

(10) Patent No.: US 11,078,331 B2
(45) Date of Patent: Aug. 3, 2021

(54) ACID NEUTRALIZING POLYMER MATERAL AND METHOD OF MAKING SAME

(71) Applicant: Workers First LLC, Pittsburgh, PA (US)

(72) Inventors: Matthew James Borowiak, Jr., Buffalo, NY (US); Richard Earl Partch, Hannawa Falls, NY (US)

(73) Assignees: Workers First LLC, Potsdam, NY (US); Clarkson University, Potsdam, NY (US)

( * ) Notice: Subject to any disclaimer, the term of this patent is extended or adjusted under 35 U.S.C. 154(b) by 27 days.

(21) Appl. No.: 16/376,669

(22) Filed: Apr. 5, 2019

(65) Prior Publication Data

US 2019/0309128 A1    Oct. 10, 2019

Related U.S. Application Data

(60) Provisional application No. 62/653,788, filed on Apr. 6, 2018.

(51) Int. Cl.
    *C08G 69/48* (2006.01)
(52) U.S. Cl.
    CPC ................... *C08G 69/48* (2013.01)
(58) Field of Classification Search
    CPC ............... C08G 69/48; C08L 79/00
    See application file for complete search history.

(56) References Cited

U.S. PATENT DOCUMENTS

| | | | |
|---|---|---|---|
| 3,725,503 | A | 4/1973 | Kunde et al. |
| 3,966,835 | A | 6/1976 | Christooph et al. |
| 4,170,682 | A | 10/1979 | Beetschen et al. |
| 5,279,899 | A | 1/1994 | Asrar |
| 5,346,959 | A | 9/1994 | Goman et al. |
| 5,491,200 | A | 2/1996 | Harris et al. |
| 6,617,267 | B2 | 9/2003 | Soane et al. |
| 8,697,831 | B2 | 4/2014 | Drysdale et al. |
| 9,234,059 | B2 | 1/2016 | Hartmann et al. |
| 9,593,201 | B2 | 3/2017 | Joy et al. |
| 9,738,756 | B2 | 8/2017 | Häffner et al. |

FOREIGN PATENT DOCUMENTS

| | | |
|---|---|---|
| EP | 0555197 | 11/1993 |
| JP | 54059422 | 5/1979 |
| JP | 59144617 | 8/1984 |
| WO | 2008108755 | 9/2008 |

OTHER PUBLICATIONS

Jia, Xinqiao; et. al., Nylon Surface Modification. Part 1. Targeting the Amide Groups for Selective Introduction of Reactive Functionalities, Department of Materials Science and Engineering, Jun. 28, 2006, pp. 4916-4924, Polymer vol. 47, Iss. 14, University of Delaware, Newark, DE 19716, USA.

Ying, Wu Bin; et al., Toward a Detoxification Fabric Against Nerve Gas Agents: Guanidine-Functionalized Poly[2-(3-butenyl)-2-Oxazoline]/Nylon-6,6 Nanofibers, Department of Applied Chemical Engineering, Mar. 2017, pp. 15246-15254, RSC Advances vol. 7, Iss. 25, College of Engineering, Chungnam National University, Daejeon 305-764, Korea.

*Primary Examiner* — Ana L. Woodward
(74) *Attorney, Agent, or Firm* — Woods Oviatt Gilman LLP; Dennis B. Danella, Esq.

(57) ABSTRACT

A method of preparing an acid reactive functionalized polyamide includes preparing a first reaction product by contacting and reacting virgin polyamide fabric material with tert-butoxide in a first aliquot of a polar aprotic solvent and preparing a second reaction product by adding an amine to a second aliquot of the polar aprotic solvent. A third reaction product is prepared by mixing the first reaction product and the second reaction product where the third reaction product is the acid reactive functionalized polyamide. The preparation of each respective reaction product is for a period of time and at a temperature sufficient to produce the respective reaction product.

8 Claims, No Drawings

ACID NEUTRALIZING POLYMER MATERAL AND METHOD OF MAKING SAME

CROSS-REFERENCE TO RELATED APPLICATIONS

This application claims the benefit of U.S. Provisional Patent Application No. 62/653,788, filed Apr. 6, 2018, entitled CHEMICAL ACID SOLUTION MATERIAL, the entirety of which is incorporated herein by reference.

TECHNICAL FIELD

The present invention relates to protective fabrics, and more particularly to protective fabrics for use in acid applications, and even more particularly to a protective fabric comprising amine functionalized nylon and the method of making such a fabric.

BACKGROUND OF THE INVENTION

Polyamides, including nylon 6 and nylon 6,6 (nylon 66), are synthetic polymers amenable to functionalization through chemical modification of the amide groups within the polymer backbone. Nylon fabrics have been modified to increase their tensile strength for military application or modified to improve dye acceptance. However, to date, nylon materials have not been modified to carry a basic pendant group, such as an amine, for use in acid protection fabrics.

The present invention addresses this, as well as other, needs.

SUMMARY OF THE INVENTION

In accordance with an aspect of the present invention, a method of preparing an acid reactive functionalized polyamide comprises preparing a first reaction product by contacting and reacting virgin polyamide fabric material with tert-butoxide in a first aliquot of a polar aprotic solvent, and preparing a second reaction product by adding an amine to a second aliquot of the polar aprotic solvent. A third reaction product is prepared by mixing the first reaction product and the second reaction product where the third reaction product is the acid reactive functionalized polyamide. The preparation of each respective reaction product is for a period of time and at a temperature sufficient to produce the respective reaction product.

In a further aspect of the present invention, the virgin polyamide fabric material comprises nylon 6 or nylon 66, the polar aprotic solvent is either dimethyl sulfoxide (DMSO) or dimethylformamide (DMF) and the amine is 2-chloro-N, N-dimethylamine. Still further, the first reaction product is prepared under stirring at room temperature for at least 1 hour, the second reaction product is prepared under stirring at room temperature for at least 2 hours, and the third reaction product is prepared under stirring at room temperature for at least 12 hours.

In another aspect of the present invention, following preparation of the third reaction product, the method may further include washing the third reaction product sequentially with the polar aprotic solvent, tetrahydrofuran (THF) and water.

In an additional embodiment of the present invention, a method of regenerating an acid reactive functionalized polyamide comprises: a) preparing a fabric comprising the acid reactive functionalized polyamide; b) contacting and reacting the fabric with an acid; and c) washing the acid-reacted fabric within a buffer solution for a period of time and at a temperature sufficient to regenerate the fabric. The buffer solution may comprise sodium bicarbonate.

DETAILED DESCRIPTION

Polyamides, such as but not limited to nylon 6 and nylon 66 may be modified through basic attack of the amide hydrogen to generate a reactive nitrogen atom within the polyamide backbone. In accordance with an aspect of the present invention, the nitrogen reacts with a basic compound, such as an amine, to bond a basic pendant group to the polyamide chain. This basic pendant group is then free to neutralize any hydrogen ions which come into contact with modified nylon.

As will be seen more specifically in the examples below, virgin nylon 6 or nylon 66 fabric is first treated with tert-butoxide (potassium tert-butoxide or t-BuOK) in a polar aprotic solvent, such as but not limited to dimethyl sulfoxide (DMSO) or dimethylformamide (DMF). Without being bound to any particular theory, it is believed that the strongly basic t-BuOK extracts the amide hydrogen to activate the amide nitrogen. In a subsequent reaction, the activated nitrogen reacts with a halogenated dialkylamine, such as but not limited to 2-chloro-dimethylamine hydrochloride, to functionalize the nylon fabric. In accordance with an aspect of the present invention, the nylon fabric must be virgin, i.e., free from any post polymerization treatments such as dyeing, which may introduce reactive groups which may interfere with the above described reactions.

In another aspect of the present invention, the virgin nylon fabric may be of any desired thickness. By way of example and without limitation thereto, the nylon fabric may have a thickness of about 1 μm to about 500 μm, and more preferably of about 5 μm to about 50 μm, and still more particularly of about 5 μm to about 20 μm.

In a further aspect of the present invention, the modified nylon fabric may be regenerated following exposure to, and neutralization of, an acid. That is, the basic amine covalently bonded to the polyamide backbone may reversibly react with a hydrogen ion. Thus, should the modified nylon fabric encounter and neutralize an acid solution, the fabric may be generated such as through a buffer wash. One non-limiting example of a suitable buffer wash includes a sodium bicarbonate solution. By way of example, laboratory gear, such as a laboratory coat for chemists, may be constructed of an embodiment of the modified nylon fabric in accordance with the present invention. Should the chemist splash or otherwise expose the coat to an acid, the modified nylon fabric will neutralize the acid before the chemist suffers an acid burn or damages his or her underlying clothing. The coat may then be washed in a bicarbonate solution to regenerate the basic amine bonded to the amide nitrogen.

In another non-limiting example, the modified nylon fabric in accordance with the present invention may be used to form at least a portion of a diaper to neutralize acid that may be contained within human excretions to reduce the possibility of skin rashes developing from prolonged contact of such acidic material with the skin. Similarly, in a further example, the modified nylon fabric in accordance with the present invention may be used to form a portion of a pair of gloves, particularly the fingers and palm portions of the gloves that are most likely to come into contact with acidic materials.

EXAMPLES

Experiment 1

Materials and Method

1. Cut 1.5×1.5 cm 5 μm thick Nylon 6,6 sample
2. Dry Nylon 6,6 sample in oven for 3 hrs
3. Dry (1) 50 ml Erlenmeyer flask (Flask 1) and (1) 250 ml Erlenmeyer flask (Flask 2) in oven for 3 hrs
4. Charge Flask 1 with 10 ml DMSO
5. Add 1 mmol 2-chloro-N, N-dimethylamine to Flask 1
6. Loosely cap and stir Flask 1 for 2 hrs
7. Charge Flask 2 with 20 ml DMSO
8. Add 2 mmol t-BuOK and Nylon 6,6 sample to Flask 2
9. Loosely cap and stir Flask 2 for 1 hr
10. Add contents from Flask 1 to contents of Flask 2
11. Stir Flask 2 for 1 hr
12. Allow Flask 2 to sit for 12 hours
13. Remove Nylon 6,6 sample
14. Wash with DMSO, THF, Water
15. Let dry for 24 hrs The weight of the nylon 6, 6 sample (Sample 1) increased from 0.01 g to 0.015 g. In addition, the nylon fiber became discolored obtaining brown or yellow tint to it and changed textures to be rougher than the unreacted virgin nylon 6, 6 sample. Most of the discoloration is cleared following the DMSO wash. When added to a pH 2.51 HCl solution, pH rose to 2.53. Following a sodium bicarbonate wash (1 g $NaHCO_3$ in 50 ml water) and sonication, addition of three swatches of Sample 1 nylon swatches to dilute HCl solution increased pH from 3.98 to 4.52.

Experiment 2

Materials and Method

1. Dry 0.82 g 5 μm thick Nylon 6,6 sample in oven for 3 hrs
2. Dry (1) 250 ml Erlenmeyer flask (Flask 1) and (1) 1000 ml Erlenmeyer flask (Flask 2) in oven for 3 hrs
3. Charge Flask 1 with 11.808 g 2-chloro-N, N-dimethylamine hydrochloride
4. Add 150 ml DMSO to Flask 1
5. Loosely cap and stir Flask 1 for 2 hrs
6. Charge Flask 2 with 18.4 g t-BuOK and Nylon 6,6 sample
7. Add 250 ml DMSO to Flask 2
8. Loosely cap and stir Flask 2 for 1 hr
9. Add contents from Flask 1 to contents of Flask 2
10. Loosely cap and stir Flask 2 for 12 hrs
11. Remove Nylon 6,6 sample
12. Wash with DMSO, THF, Water
13. Let dry for 24 hrs The weight of the nylon 6, 6 sample (Sample 2) decreased 0.2 g. In addition, the nylon fiber became discolored obtaining brown tint. When added to a pH 3.56 HCl solution, pH rose to 5.29.

Experiment 3

Materials and Method

1. Cut 1.5×1.5 cm 5 μm thick Nylon 6,6 sample
2. Dry Nylon 6,6 sample in oven for 1.5 hrs
3. Dry (1) 50 ml Erlenmeyer flask (Flask 1) and (1) 250 ml Erlenmeyer flask (Flask 2) in oven for 1.5 hrs
4. Charge Flask 1 with 0.3 g 2-chloro-N, N-dimethylamine hydrochloride
5. Add 20 ml DMSO to Flask 1
6. Loosely cap and stir Flask 1 for 2 hrs
7. Charge Flask 2 with 0.45 g t-BuOK and Nylon 6,6 sample
8. Add 30 ml DMF to Flask 2
9. Loosely cap and stir Flask 2 for 1 hr
10. Add contents from Flask 1 to contents of Flask 2
11. Loosely cap and stir Flask 2 for 12 hrs
12. Remove Nylon 6,6 sample
13. Wash with DMF, THF, Water
14. Let dry for 1.5 hrs The weight of the nylon 6, 6 sample (Sample 3) increased 100%. In addition, there was little change in color and texture of the nylon fiber. When added to a pH 3.30 HCl solution, pH rose to 3.68. Following a sodium bicarbonate wash (1 g $NaHCO_3$ in 50 ml water) and sonication, addition of a single Sample 3 nylon swatch to dilute HCl solution increased pH from 2.98 to 3.43.

Experiment 4

Materials and Method

1. Dry 0.86 g 5 μm thick Nylon 6,6 sample in oven for 3 hrs
2. Dry (1) 250 ml Erlenmeyer flask (Flask 1) and (1) 1000 ml Erlenmeyer flask (Flask 2) in oven for 3 hrs
3. Charge Flask 1 with 12.5 g 2-chloro-N, N-dimethylamine hydrochloride
4. Add 150 ml DMSO to Flask 1
5. Loosely cap and stir Flask 1 for 2 hrs
6. Charge Flask 2 with 19.5 g t-BuOK and Nylon 6,6 sample
7. Add 300 ml DMF to Flask 2
8. Loosely cap and stir Flask 2 for 1 hr
9. Add contents from Flask 1 to contents of Flask 2
10. Loosely cap and stir Flask 2 for 12 hrs
11. Remove Nylon 6,6 sample
12. Wash with DMF, THF, Water
13. Let dry for 1.5 hrs Little change in color and texture of the nylon fiber was noted. When added to a pH 2.85 HCl solution, pH rose to 5.68.

From the above examples, it should be noted that each of the reactions may take place at room temperature, defined as between 20-24° C. Additionally, each reaction may also occur at ambient pressure, and in one aspect of the present invention, each reaction should avoid high pressure conditions, i.e., greater than about 100 torr (0.133 bar) above ambient pressure.

Although the invention has been described with reference to preferred embodiments thereof, it is understood that various modifications may be made thereto without departing from the full spirit and scope of the invention as defined by the claims which follow.

What is claimed is:

1. A method of preparing an acid neutralizing polyamide, comprising:
    a) preparing a first reaction product by contacting and reacting virgin polyamide fabric material with tert-butoxide in a first aliquot of a polar aprotic solvent;
    b) preparing a mixture of 2-chloro-N, N-dimethylamine and a second aliquot of the polar aprotic solvent; and c) preparing a second reaction product being the acid neutralizing polyamide by mixing the first reaction product and the mixture, wherein each of steps a) and c) is for a period of time and at a temperature sufficient to produce the respective first and second reaction products.

2. The method of claim 1 wherein the virgin polyamide fabric material comprises nylon 6 or nylon 66.

3. The method of claim 1 wherein the polar aprotic solvent is either dimethyl sulfoxide (DMSO) or dimethylformamide (DMF).

4. The method of claim 1 wherein the first reaction product is prepared under stirring at room temperature for at least 1 hour.

5. The method of claim 1 wherein the the mixture of step b) is prepared under stirring at room temperature for at least 2 hours.

6. The method of claim 1 wherein the third second reaction product is prepared under stirring at room temperature for at least 12 hours.

7. The method of claim 1 further comprising the step of:

d) following the preparation step c), washing the second reaction product sequentially with the polar aprotic solvent, tetrahydrofuran (THF) and water.

8. An acid neutralizing polyamide fabric material produced according to the method of claim 1.

* * * * *